May 7, 1963  G. H. YELINEK  3,088,594
FILTER MECHANISM
Original Filed Aug. 12, 1952
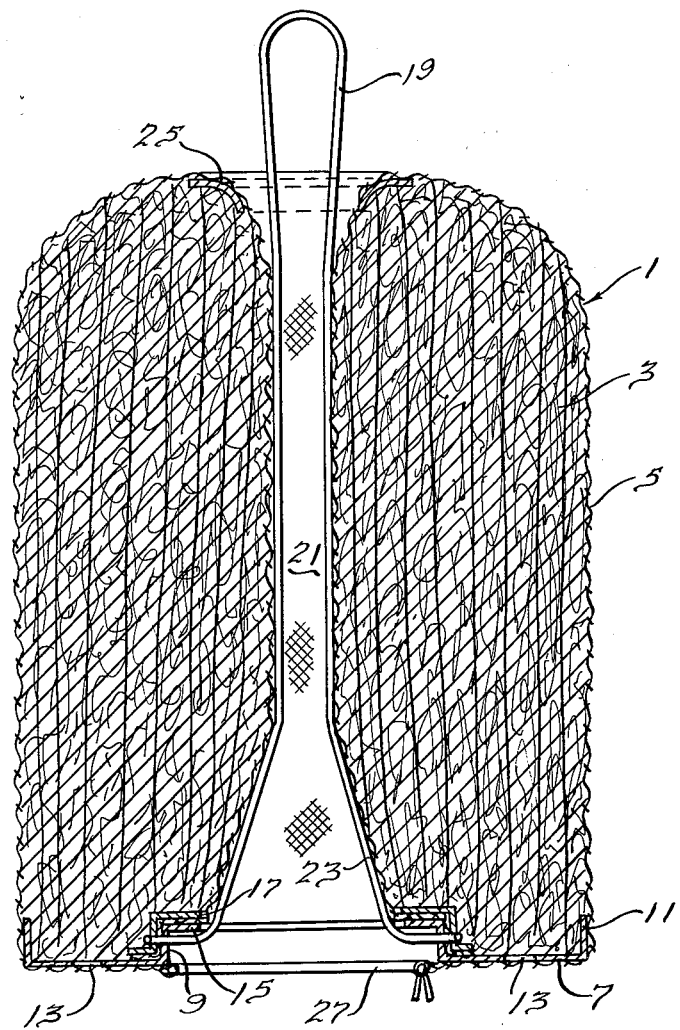
INVENTOR.
Gustav H. Yelinek.
BY
Harness, Dickey & Pierce.
ATTORNEYS.

3,088,594
FILTER MECHANISM
Gustav H. Yelinek, La Porte, Ind., assignor, by mesne assignments, to Walker Manufacturing Company, Racine, Wis., a corporation of Delaware
Original application Aug. 12, 1952, Ser. No. 303,859, now Patent No. 2,910,814, dated Nov. 3, 1959. Divided and this application Feb. 18, 1959, Ser. No. 796,727
1 Claim. (Cl. 210—237)

My invention concerns filter cartridges of a type that is particularly suited for use in oil filters but which may be used in filtering practically all liquids of proper viscosity, such as gasoline, naphthas, cooking fats, wine, etc. This application is a division of application Serial No. 303,859, filed August 12, 1952, now Patent No. 2,910,814.

An object of my invention is to provide a filter cartridge having improved operating characteristics.

Another object is to reduce the cost of manufacture of filter cartridges.

In the filter cartridge of my invention I use absorbent and adsorbent filtering material that is confined in a state of axial and radial compression by a suitable container, preferably a flexible sock such as is commony used in the oil filter cartridge art. I prefer to use a mixture of redwood bark and raw cotton as the filtering material, the redwood bark acting as resilient means to prevent compacting of the cotton. I form my filter by placing the mass of filter material around the sock, which serves as a core, and then turning one end of the sock inside out and forcing the filter material into the turned-over portion of the sock during which operation the filter material is substantially reduced in length. My filter cartridge constructions contain novel features which enable the sock and a base section to be formed as a subassembly. The base section may be used to provide a convenient anchor for one end of the sock in the filter material. It may also be used as an anchor for a suitable handle whereby the cartridge may be readily handled and removed from the oil filter proper.

Various other objects and features of the invention will become apparent upon consideration of the accompanying drawings in which the figure shows a longitudinal cross section through an oil filter cartridge embodying the invention.

The cartridge 1 has a mass of filtering material 3 which is enclosed and held in a predetermined shape by a flexible container, preferably a porous fabric 5 commonly known as a cartridge "sock". The bottom or base (and inlet end) of the cartridge is provided by an annular plate 7 which has annular inner and outer flanges 9 and 11. The inner flange 9 defines a central opening at the bottom of the cartridge and additional openings in the bottom of the cartridge may be provided by apertures 13. The inner flange 9 is turned radially inwardly to form an annular radial flange 15. Mating with the flanges 15 and 9 is an annular seal ring 17 which is used to clamp one end of the sock 5 against the flanges on the bottom plate as best shown in FIGURES 3 and 13. The seal 17 is formed of soft metal and is dimensioned so that it has a press fit on the flange 9 when forced over it and the end of the sock. The looped wire handle 19 has its ends extending through aligned apertures in the seal ring 17 and the flange 9 whereby the wire handle, like the sock 5, is anchored to the base plate 7 and whereby it may also serve to hold the seal ring in place.

The sock 5 extends away from its anchor on the base plate 7 and up through the center of the filter cartridge and defines the side wall of the central aperture 21 that extends from end to end of the filter element. By means to be detailed hereinafter, the lower end of the aperture 21 is formed in the shape of a cone 23 to provide the desirable operating characteristics referred to in Hurn Patent No. 2,168,124, the present filter cartridges being able to replace the patented cartridges in the various oil filter constructions. A top seal ring 25 is located inside of the sock at the top end of the aperture 21 and serves to positively maintain the opening. It is apparent that the sock 5 will permit a certain amount of expansion and contraction in the diameter of the aperture 21 and that this aperture is therefore adapted to tightly grip the standpipe (not shown) of the oil filter unit proper (not shown) in which the cartridge is inserted. The sock 5 is turned inside out or outwardly back upon itself over the mass of filter material 3 and defines the outer enclosing surface of the cartridge. The free end of the sock has a draw cord or shirr string 27 disposed therein so that when the free end of the sock 5 is turned over against the back of the base plate 7, as shown in FIGS. 12 and 13, the draw cord 27 may be tied to secure the sock firmly in place.

All of the parts except the filter material 3 and the seal 25 can be united together in a convenient subassembly. The subassembly can be readily made up from its detail parts and is ideally suited for manufacture at a separate point or location from which it can be shipped or delivered to the place where the actual completed cartridges 1 are manufactured and shipped.

The filter material 3 comes in a batt or strip that is spirally wrapped up into a roll. The filter material which I presently prefer to use is a mixture of redwood bark and virgin or raw cotton, the cotton preferably being around 60% and the bark 40%, this material being available in batt form on the open market. The redwood particles and cotton fibers are randomly but uniformly disposed through the batt, the cotton fibers being similar in shape and arrangement to those found in conventional cotton insulation or household cotton batting. The redwood bark particles seem to act like tiny springs and prevent harmful compacting of the filter material during actual use and also act as strainers to catch impurities.

It will now be apparent that the invention provides an improved filter cartridge that may also be economically manufactured. Various modifications of the construction, method, and apparatus illustrated may, of course, be made without departing from the spirit and scope of the invention.

I claim:
In a filter cartridge, the combination of a base plate having a central opening with a flange around it, an annular body of filter material on said base plate said flange extending axially from the same side of the base plate as the filter material, said filter material comprising compressed fibrous material, an elongated sock holding said fibrous material in compressed condition and extending axially from said opening and having one end embracing said flange, said sock extending axially through the center of said filter body and forming a flexible center tube for it, said sock being reversely turned around the outside of the filter body and having its outer end extending over the outside of said base plate, a ring fitting on the outside of said flange and clamping said one sock end to said flange, said filter body, flange, sock, and ring being substantially coaxial and defining the axis of said cartridge, an axially extending flexible wire handle inside the flexible center tube formed by said sock and having a portion extending transversely to said cartridge axis and through the flange, sock end, and ring and serving to hold them together.

References Cited in the file of this patent

UNITED STATES PATENTS

| | | |
|---|---|---|
| 2,188,488 | Talmadge | Jan. 30, 1940 |
| 2,367,745 | Wicks | Jan. 23, 1945 |
| 2,597,770 | Alexander et al. | May 20, 1952 |
| 2,703,650 | Supinger | Mar. 8, 1955 |